United States Patent
Ueda et al.

(10) Patent No.: US 10,466,939 B2
(45) Date of Patent: Nov. 5, 2019

(54) COMPUTER-READABLE MEDIUM STORING COMPUTER-READABLE INSTRUCTIONS FOR EDITING IMAGE DATA TO BE PROVIDED TO TARGET DEVICE

(71) Applicant: Brother Kogyo Kabushiki Kaisha, Nagoya-shi, Aichi-ken (JP)

(72) Inventors: Hideaki Ueda, Nagoya (JP); Tetsuya Nose, Nagoya (JP); Junjiro Yoshida, Nagoya (JP); Yongqi Sun, Tokyo (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 16/021,105

(22) Filed: Jun. 28, 2018

(65) Prior Publication Data

US 2019/0087135 A1 Mar. 21, 2019

(30) Foreign Application Priority Data

Sep. 15, 2017 (JP) .................................. 2017-178133

(51) Int. Cl.
*G06F 3/12* (2006.01)
*G06F 3/0484* (2013.01)
(Continued)

(52) U.S. Cl.
CPC .......... *G06F 3/1205* (2013.01); *G06F 3/0482* (2013.01); *G06F 3/04842* (2013.01); *H04N 1/00424* (2013.01); *H04N 1/00427* (2013.01)

(58) Field of Classification Search
CPC .. G06F 3/1205; G06F 3/0482; G06F 3/04842; H04N 1/00424; H04N 1/00427
(Continued)

(56) References Cited

U.S. PATENT DOCUMENTS 6,441,920 B1* 8/2002 Smith ..................... B41B 19/00
358/1.1
8,149,453 B2* 4/2012 Tanaka ....................... B41J 3/46
347/106
(Continued)

FOREIGN PATENT DOCUMENTS

JP 2014-071584 A 4/2014

*Primary Examiner* — Allen H Nguyen
(74) *Attorney, Agent, or Firm* — Banner & Witcoff, Ltd.

(57) ABSTRACT

A non-transitory computer-readable medium stores computer-readable instructions including a first module and a second module. The second module is configured to, when executed by a processor, cause the processor to receive from the first module compatible-device information specifying compatible devices that are compatible with the first module, receive connected-device information specifying connected devices that are connected via a network interface, determine, as a target device, a particular one of selectable devices specified by both the compatible-device information and the connected-device information, and provide target device information identifying the target device to the first module. The first module is further configured to, when executed by the processor, cause the processor to, after receiving the target device information, in response to receiving an image generating instruction from the second module, generate display image data corresponding to the target device identified by the target device information.

13 Claims, 7 Drawing Sheets

(51) Int. Cl.
*G06F 3/0482* (2013.01)
*H04N 1/00* (2006.01)
(58) Field of Classification Search
USPC .......................................................... 358/1.9
See application file for complete search history.

(56) References Cited

U.S. PATENT DOCUMENTS

2002/0001100 A1* 1/2002 Kawanabe ............. G06K 15/00
    358/1.15
2004/0263870 A1* 12/2004 Itoh ....................... G06F 3/1204
    358/1.1
2005/0105116 A1* 5/2005 Kobashi ................ G06F 17/211
    358/1.12
2013/0094045 A1* 4/2013 Nakata .................. G06F 3/1204
    358/1.13

* cited by examiner

PA100
PA100(COPY)
PA200
PB100

FIG. 4

REGISTERED PRINTER: PA100
PA100
PA200
PB100

FIG. 5

COMPUTER-READABLE MEDIUM STORING COMPUTER-READABLE INSTRUCTIONS FOR EDITING IMAGE DATA TO BE PROVIDED TO TARGET DEVICE

CROSS-REFERENCE TO RELATED APPLICATION

This application claims priority under 35 U.S.C. § 119 from Japanese Patent Application No. 2017-178133 filed on Sep. 15, 2017. The entire subject matter of the application is incorporated herein by reference.

BACKGROUND

Technical Field

Aspects of the present disclosure are related to a non-transitory computer-readable medium storing computer-readable instructions for editing image data to be provided to a target device.

Related Art

Technical methods and configurations for causing a terminal apparatus, which is communicably connected with a label printer, to edit an image to be printed by the label printer have been known.

SUMMARY

Nowadays, various types of printers having respective different functions have been developed as special-purpose printers such as label printers. In such a situation, a large burden might be imposed on a developer who attempts to develop an image editing program compatible with the various types of printers.

Aspects of the present disclosure are advantageous to provide one or more improved techniques to cause an information processing apparatus to edit image data to be provided to an intended one of devices.

According to aspects of the present disclosure, a non-transitory computer-readable medium is provided, which stores computer-readable instructions that are executable by a processor coupled with an information processing apparatus. The information processing apparatus includes a display, a user interface, and a network interface. The instructions include a first module and a second module. The second module is configured to, when executed by the processor, cause the processor to control the display to display an edit screen for editing an object, accept an edit instruction to edit the object, via the user interface while the edit screen is being displayed, provide the first module with first instruction information instructing the first module to generate first image data, the first image data representing a first image containing the object edited in accordance with the accepted edit instruction, after providing the first instruction information to the first module, receive the first image data generated by the first module, from the first module, control the display to display on the edit screen the first image containing the edited object, based on the received first image data, and in response to accepting an instruction to provide second image data to a target device, via the user interface while the first image is being displayed on the edit screen, provide the first module with second instruction information instructing the first module to generate the second image data, the second image data representing a second image containing the edited object. The first module is configured to, when executed by the processor, cause the processor to receive the first instruction information from the second module, in response to receiving the first instruction information, generate the first image data, provide the generated first image data to the second module, in response to receiving the second instruction information from the second module after providing the first image data, generate the second image data corresponding to the first image data, and provide the generated second image data to the target device. The second module is further configured to, when executed by the processor, cause the processor to receive compatible-device information from the first module, the compatible-device information specifying compatible devices that are compatible with the first module, receive connected-device information specifying connected devices that are connected via the network interface, determine, as the target device, a particular one of selectable devices that are specified by both the received compatible-device information and the received connected-device information, and provide target device information identifying the determined target device to the first module. The first module is further configured to, when executed by the processor, cause the processor to provide the compatible-device information to the second module, after providing the compatible-device information, receive the target device information from the second module, in response to receiving the first instruction information after receiving the target device information, generate the first image data corresponding to the target device identified by the target device information, in response to receiving the second instruction information after receiving the target device information, generate the second image data corresponding to the first image data and suitable for the target device identified by the target device information, and provide the generated second image data to the target device via the network interface.

According to aspects of the present disclosure, further provided is a non-transitory computer-readable medium storing computer-readable instructions that are executable by a processor coupled with an information processing apparatus. The information processing apparatus includes a display, a user interface, and a network interface. The instructions are configured to, when executed by the processor, cause the processor to control the display to display an edit screen for editing an object, accept an edit instruction to edit the object, via the user interface while the edit screen is being displayed, provide a processor-executable module with first instruction information instructing the processor-executable module to generate first image data, the first image data representing a first image containing the object edited in accordance with the accepted edit instruction, after providing the first instruction information to the processor-executable module, receive the first image data generated by the processor-executable module, from the processor-executable module, control the display to display on the edit screen the first image containing the edited object, based on the received first image data, in response to accepting an instruction to provide second image data to a target device, via the user interface while the first image is being displayed on the edit screen, provide the processor-executable module with second instruction information instructing the processor-executable module to generate the second image data, the second image data representing a second image containing the edited object, receive compatible-device information from the processor-executable module, the compatible-device information specifying compatible devices that are compatible with the processor-executable module, receive connected-device information specifying connected devices that are connected via the network interface, determine, as the target device, a particular one of selectable devices that are specified by both the received compatible-device information and the received connected-device information, and provide target device information identifying the determined target device to the processor-executable module.

According to aspects of the present disclosure, further provided is a non-transitory computer-readable medium storing computer-readable instructions that are executable by a processor coupled with an information processing apparatus. The information processing apparatus includes a display, a user interface, and a network interface. The instructions are configured to, when executed by the processor, cause the processor to provide compatible-device information to a processor-executable module, the compatible-device information specifying compatible devices that are compatible with the instructions, after providing the compatible-device information, receive target device information identifying a target device from the processor-executable module, in response to receiving first instruction information from the processor-executable module after receiving the target device information, generate first image data corresponding to the target device identified by the target device information, provide the generated first image data to the processor-executable module, in response to receiving second instruction information from the processor-executable module after providing the first image data, generate second image data corresponding to the first image data and suitable for the target device identified by the target device information, and provide the generated second image data to the target device via the network interface.

BRIEF DESCRIPTION OF THE ACCOMPANYING DRAWINGS

FIG. 4 exemplifies a connected-printer list in the illustrative embodiment according to one or more aspects of the present disclosure.

FIG. 5 exemplifies a compatible-driver list in the illustrative embodiment according to one or more aspects of the present disclosure.

Figure 6:
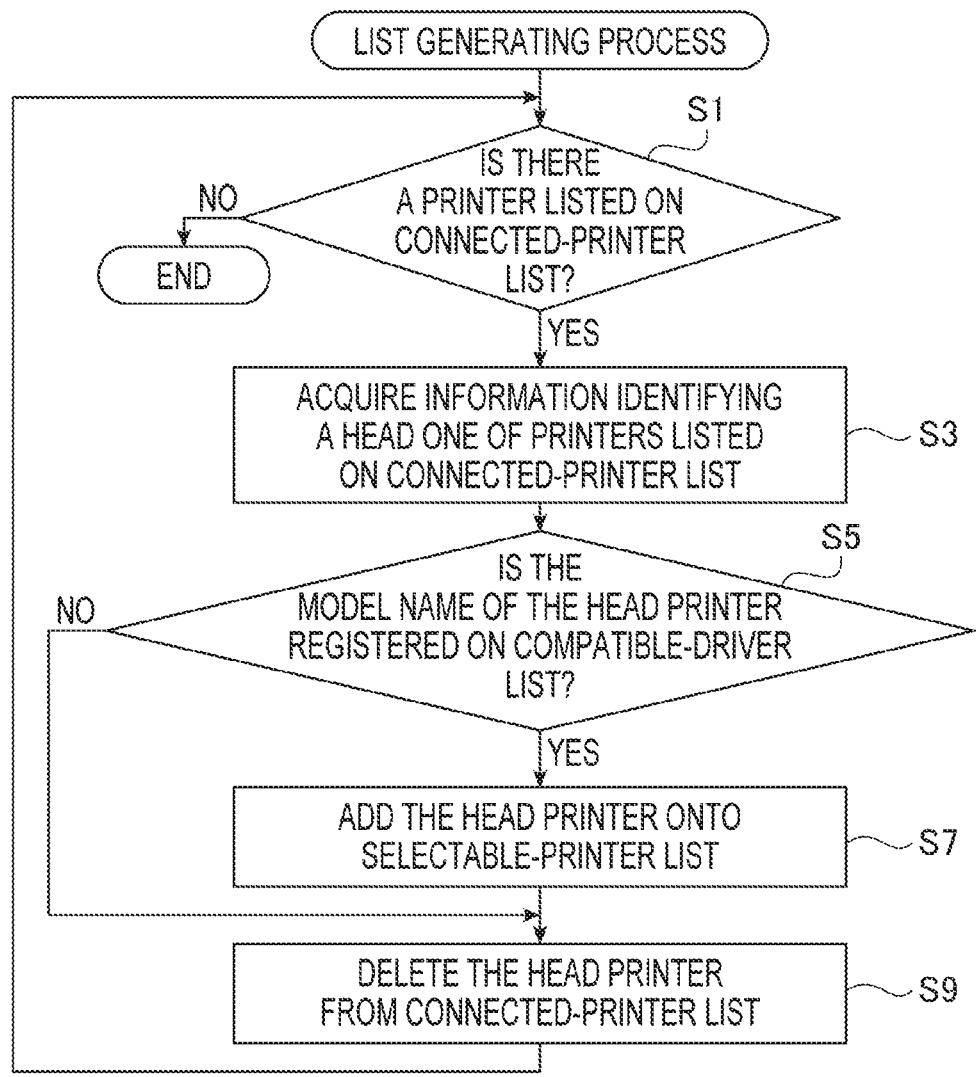

FIG. 6 is a flowchart showing a procedure of a list generating process in the illustrative embodiment according to one or more aspects of the present disclosure.

Figure 7:
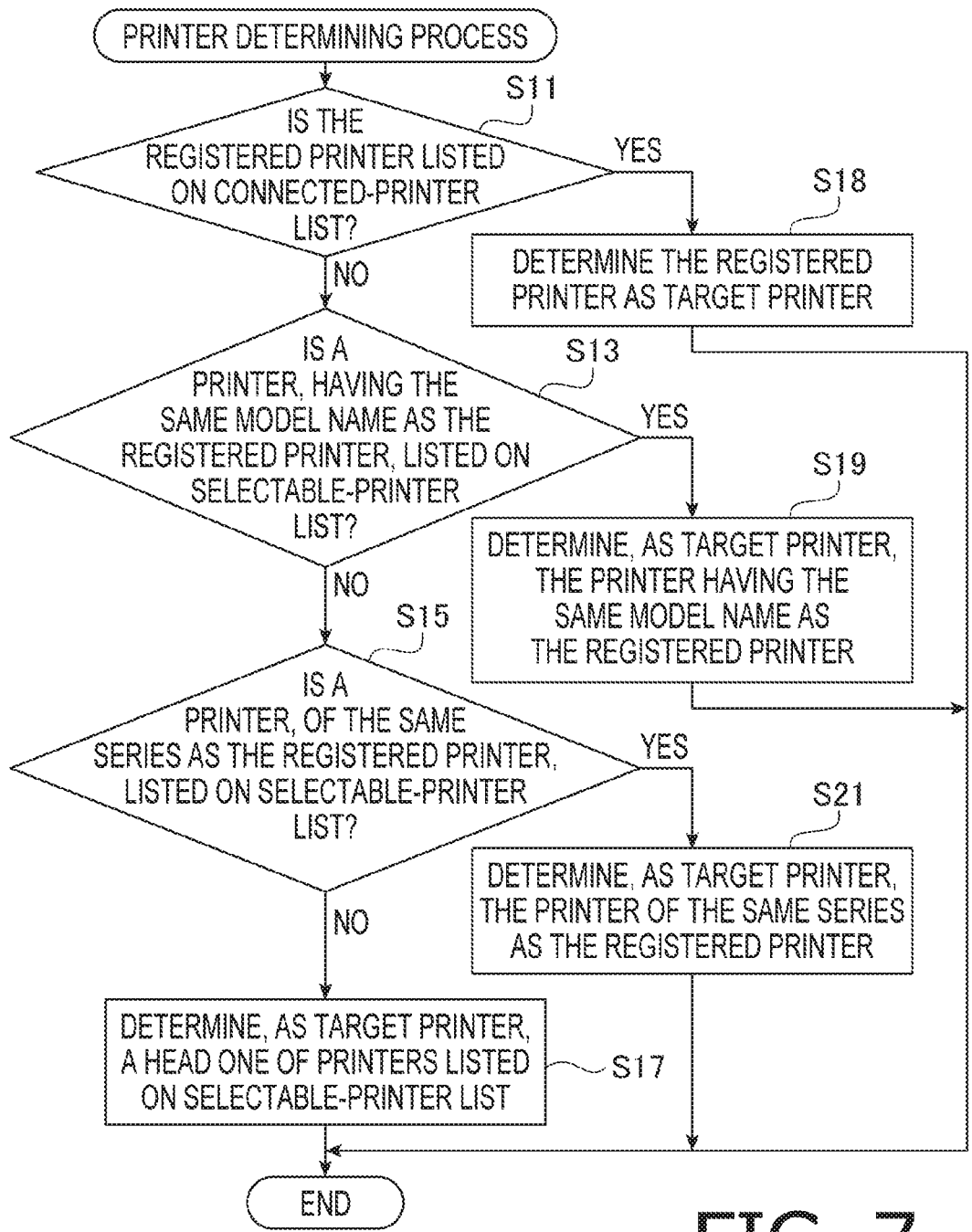

FIG. 7 is a flowchart showing a procedure of a printer determining process in the illustrative embodiment according to one or more aspects of the present disclosure.

Figures 8, 9:
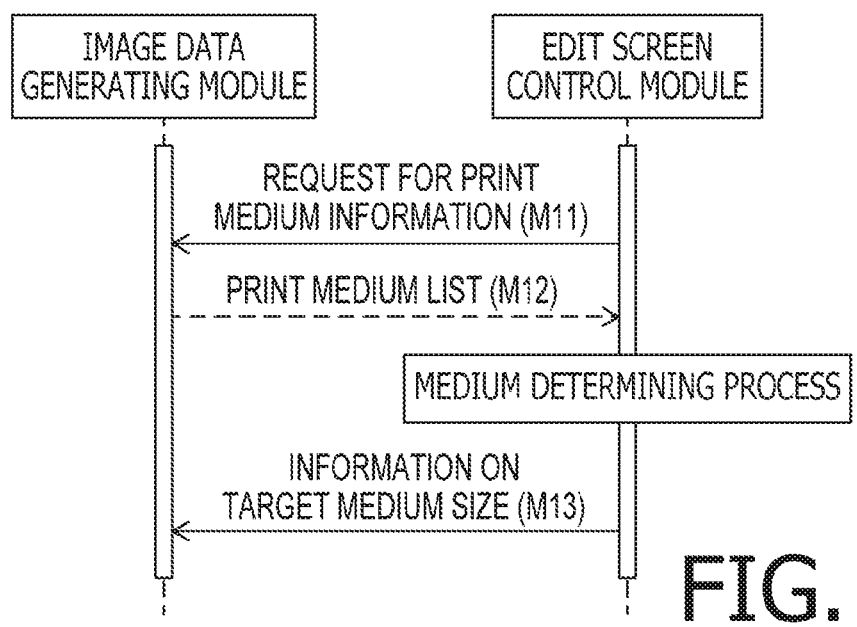

FIG. 8 is a sequence chart of a medium determining sequence in the illustrative embodiment according to one or more aspects of the present disclosure.

FIG. 9 exemplifies a print medium list in the illustrative embodiment according to one or more aspects of the present disclosure.

Figure 10:
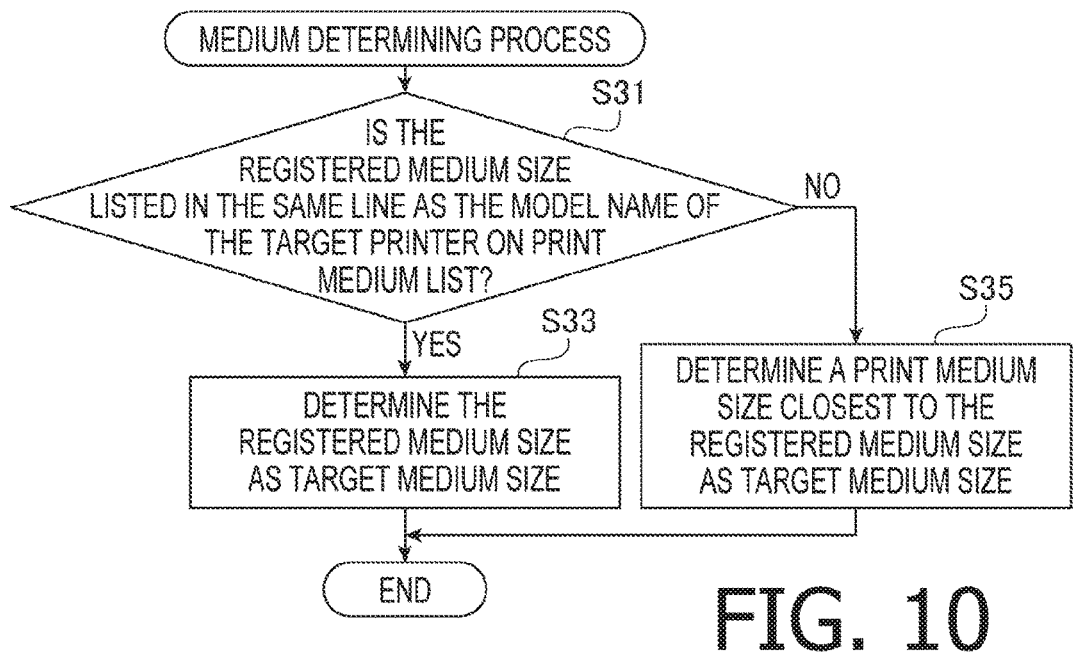

FIG. 10 is a flowchart showing a procedure of a medium determining process in the illustrative embodiment according to one or more aspects of the present disclosure.

Figure 11:
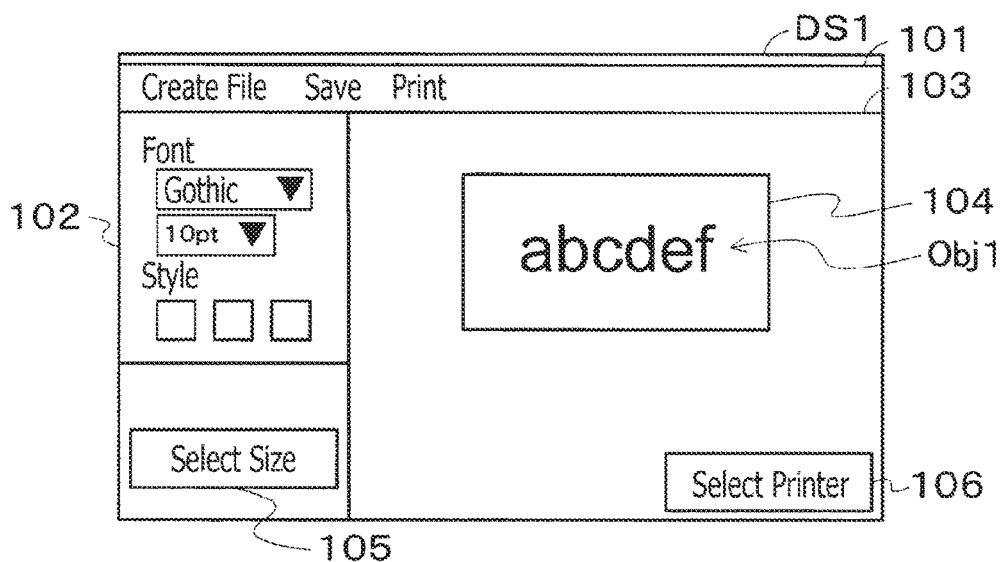

FIG. 11 exemplifies an edit screen in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

<Configuration of Printing System>

Hereinafter, an illustrative embodiment according to aspects of the present disclosure will be described with reference to the accompanying drawings.

Figure 1:
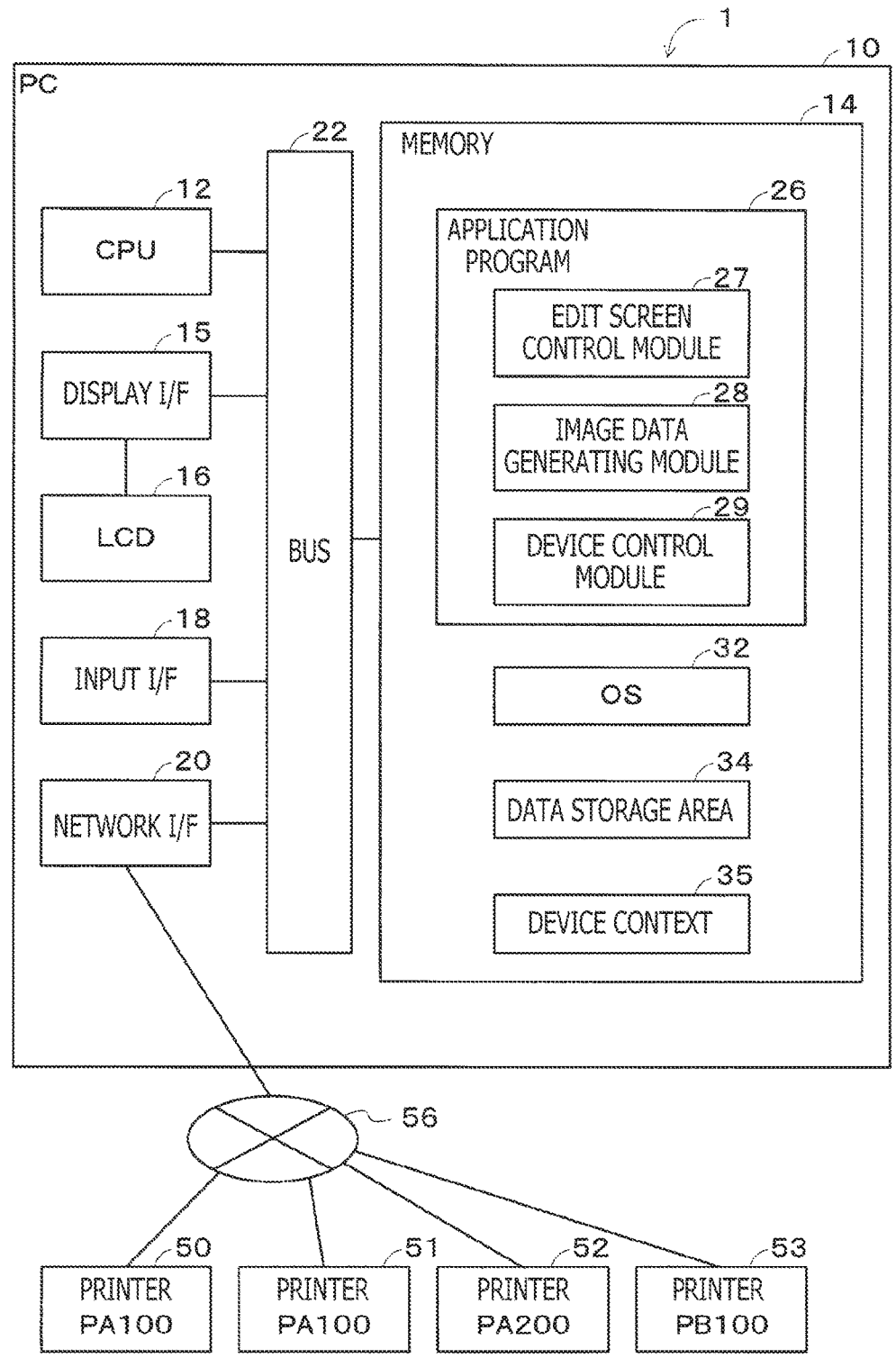
FIG. 1 is a block diagram schematically showing a configuration of a printing system in an illustrative embodiment according to one or more aspects of the present disclosure.

FIG. 1 is a block diagram showing a configuration of a printing system in the illustrative embodiment. As shown in FIG. 1, the printing system 1 includes a PC 10 and printers 50 to 53. The PC 10 includes a CPU 12, a memory 14, a display I/F ("I/F" is an abbreviation of "interface") 15, an LCD 16, an input I/F 18, and a network I/F 20. The elements included in the PC 10 are interconnected to communicate with each other via a bus 22.

The PC 10 is configured to communicate with the printers 50 to 53 via the network I/F 20 and a network 56. For instance, the network 56 may include at least one of a wired LAN, a wireless LAN, a WAN, a Wi-Fi (trademark registered) connection, a Bluetooth (trademark registered) connection, and a USB connection. In the illustrative embodiment, the printers 50 to 53 are provided with apparatus model names "PA100," "PA100," "PA200," and "PB200," respectively. In each model name, the alphabet following "P" represents a series name of the corresponding printer. Namely, the printers 50 and 51 are of the same model, and the printers 50 to 52 are of the same series. The printers 50 to 53 have substantially the same configuration. Hereinafter, each individual printer may be referred to as a "device."

For instance, each of the printers 50 to 53 may be a label printer configured to perform data communication with the PC 10 and produce a label with a desired text and/or a desired image printed thereon under control by the PC 10. More specifically, for instance, each of the printers 50 to 53 may be configured to print a text or an image on a long tape (e.g., a laminated film), thereby producing a label. Each of the printers 50 to 51 may include a memory (not shown) storing a model name and an IP address of the corresponding printer.

The CPU 12 is configured to perform processes in accordance with an application program 26 and an OS 32 previously stored in the memory 14. The application program 26 is for producing a label by one of the printers 50 to 53. The application program 26 includes processing modules such as an edit screen control module 27, an image data generating module 28, and a device control module 29. It is noted that the application program 26 may not necessarily be an aggregation of a plurality of programs as described above. The application program 26 may be configured as a single program.

The OS 32 is system software that provides basic functions usable by the applications programs 26. The OS 32 is an operating system such as Microsoft Windows (trademark registered), MacOS (trademark registered), Linux (trademark registered), Android (trademark registered), and iOS (trademark registered). Hereinafter, the CPU 12 executing a program may be simply referred to as a name of the program. For instance, an expression "the application program 26" may represent "the CPU 15 executing the application program 26."

Figure 2:
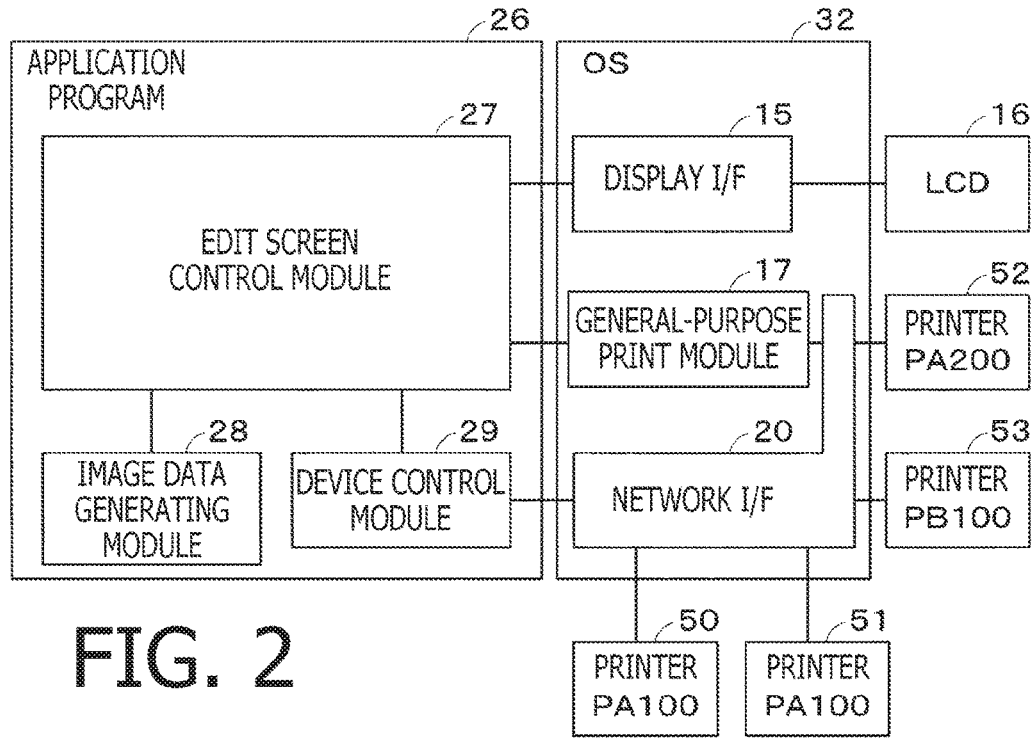
FIG. 2 is a block diagram conceptually showing a relationship among programs and devices included in the printing system, in the illustrative embodiment according to one or more aspects of the present disclosure.

FIG. 2 shows a conceptual relationship between the programs and hardware elements or devices. For instance, the edit screen control module 27 includes one or more programs to display on the LCD 16 an edit screen for generating and editing image data for a label. Further, for instance, the edit screen control module 27 is configured to transmit an instruction to display the edit screen on the LCD 16 to the OS 32 via an API ("API" is an abbreviation of "Application Programming Interface") provided by the OS 32, thereby causing the LCD 16 to display the edit screen on the LCD 16, using a display program of the OS 32. In response to the instruction from the edit screen control module 27, the OS 32 controls the display I/F 15 to display the edit screen on the LCD 16.

The edit screen control module 27 provides the image data generating module 28 with an instruction to generate display image data representing a display image containing an object image editable on the edit screen. Then, the edit screen control module 27 receives, from the image data generating module 28, display image data generated by the image data generating module 28, and causes the LCD 16 to display the display image based on the received display image data. Specifically, the object image represents an object editable via the edit screen, and corresponds to an image (e.g., an image of a series of character strings, an image of a group of figures, and a single barcode) to be formed on a label. The object is a bundle of processable data having a plurality of attributes. In response to accepting an input operation to edit the object via the input I/F, the edit screen control module 27 provides the image data generating module 28 with an instruction to generate display image data representing a display image to be displayed, which contains an object image representing the object edited in accordance with the accepted input operation. It is noted that exemplary operations of "editing the object" may include, but are not limited to, adding an object, deleting the object, changing a size of the object, moving the object, changing input data, and changing a color of the input data. For instance, the input data may be a series of character strings. The edit screen control module 27 provides the image data generating module 28 with an instruction to generate print image data representing the edited object to be printed by one of the printers 50 to 53. Then, the edit screen control module 27 receives, from the image data generating module 28, print image data generated by the image data generating module 28. Afterwards, the edit screen control module 27 may provide the received print image data and a print instruction to the device control module 29, thereby causing one of the printers 50 to 53 to print an image based on the print image data on a label. Further, the edit screen control module 27 may provide the received print image data and a print instruction to a general-purpose print module 17, thereby causing one of the printers 50 to 53 to print the image based on the print image data on a label. An AirPrint (trademark registered) module included in the MacOS may be an example of the general-purpose print module 17. The AirPrint module may provide the received print instruction to print the image based on the print image data, to one of the printers 50 to 53 via the network I/F 20. It is noted that, in the following description, the display image data and the print image data may be collectively referred to as "image data."

The image data generating module 28 includes one or more programs configured to generate and edit image data representing an image to be formed on a label, and further includes a library for generating and editing the image data for the label. In response to receipt of an instruction from the edit screen control module 27, the image data generating module 28 generates display image data representing an editable image for the label to be displayed on the LCD 16, or generates print image data representing an image to be printed on the label by one of the printers 50 to 53.

The device control module 29 includes one or more programs to cause the printers 50 to 53 to perform printing via the network I/F 20. For instance, the device control module 29 receives, from the edit screen control module 27, a print instruction and print image data representing an image to be printed on a label by one of the printers 50 to 53. Then, according to the received print instruction, the device control module 29 converts the received print image data into print data to be used for printing, and transmits the print data to an intended one of the printers 50 to 53, thereby causing the intended printer to print an image based on the print data on a label. It is noted that the device control module 29 issues an instruction to the OS 32, thereby transmitting the print data to the intended printer via the network I/F 20.

The memory 14 (see FIG. 1) has a data storage area 34. The data storage area 34 is configured to store data required for the CPU 12 to execute the application program 26. The memory 14 may include at least two of various memories such as a RAM, a ROM, a flash memory, an HDD, a portable storage medium (e.g., a USB memory) detachably attached to the PC 10, and a buffer of the CPU 12.

Further, the memory 14 may include at least one of non-transitory computer-readable storage media. The non-transitory computer-readable storage media include a CD-ROM and a DVD-ROM as well as the aforementioned memories. The non-transitory computer-readable storage media are tangible media. It is noted that a transitory propagating electrical signal, carrying a program downloaded from a server on an Internet, is a computer-readable medium but not a non-transitory computer-readable storage medium.

Further, the memory 14 has a device context 35. The device context 35 is a storage area which the OS 32 secures for drawing in the memory 14, for instance, in response to a request from the edit screen control module 27. The device context 35 has a drawing area to be used for the image data generating module 28 to draw an object. Further, the device context 35 has a setting area to store setting information (e.g., a thickness of a straight line to be drawn) for drawing. After securing a storage area for the device context 35 in the memory 14, the OS 32 provides to the image data generating module 28 an authority to edit data in the drawing area of the device context 35 and change the setting information in the setting area of the device context 35. After acquiring the authority, the image data generating module 28 draws a raster image of the object in the drawing area of the device context 35, for instance, using the API provided by the OS 32. The OS 32 causes the LCD 16 to display an image based on the drawn raster image and the setting information in the device context 35. The OS 32 may secure the device context 35 in the memory 14 as needed, independently of a request from the edit screen control module 27.

The LCD 16 is configured to display various kinds of information of the PC 10. The LCD 16 is connected with the bus 22 via the display I/F 15. The LCD 16 acquires display data via the display I/F 15.

The input I/F 18 is configured to accept therethrough an input of a user operation. The input I/F 18 may include a keyboard and a mouse. Further, the input I/F 18 may include a touch sensor formed as a thin layer on a display screen of the LCD 16.

In the following processes and flowcharts, each of the processing steps generally represents a process by the CPU 12 in accordance with instructions described in programs (e.g., the application program 26). Namely, in the following description, each of the processes such as "determining," "extracting," "selecting," "calculating," "determining," "specifying," "identifying," "acquiring," "receiving," "accepting," "transmitting" and "controlling" represents a process by the CPU 12. The processes by the CPU 12 may include hardware control using the API of the OS 32. In the following description, operations of each program may be described without referring to the OS 32. In other words, in the following description, "a program B controls a hardware element C" may denote "a program B controls a hardware element C by using the API of the OS 32." Further, it is noted that "acquiring" may be used as a conceptual operation that does not necessarily need a request therefor. Likewise, "receiving" may be used as a conceptual operation that does not necessarily need a request therefor. In other words, a conceptual operation "the CPU 12 acquires data" may contain an operation of the CPU 12 to acquire data without issuing any request for the data. Further, a conceptual operation "the CPU 12 receives data" may contain an operation of the CPU 12 to receive data without issuing any request for the data. In the following description, "data" may represent computer-readable bit string. Further, two or more pieces of data having substantially equivalent information but expressed in respective different formats may be treated as the same data. The same applies to "information."

<Initial Sequence>

A vendor of the application program 26 needs to meet requirements for the compatibility of the application program 26 with a various types of devices. Meanwhile, depending on the type of each individual device, device specifications differ which may include intended usage purposes, intended target users, print capability (e.g., acceptable sheet types/sizes, configurable resolutions, and printable colors), communication capability, and a control method (e.g., applicable control command systems, and the number of acceptable commands). It is noted that, in the following description, "sheet" will be used as a term representing a print medium for the sake of explanatory convenience. In this case, the "sheet" may definitionally include but is not limited to a paper sheet, a resin sheet, a cloth sheet, a metal sheet, a glass sheet, a wood sheet, and a fiber sheet.

For instance, printers A, B, C, D, E, and F (not shown) are exemplified as devices with which the vendor needs to meet requirements for the compatibility of the application program 26. The application program 26 is configured to edit an image and provide an intended device with image formation data for causing the intended device to form the edited image.

The printer E is a household label printer. The printer E is configured to, when a cartridge storing a label-shaped sheet having a width of 6 mm to 36 mm is attached thereto, print an image on the sheet stored in the cartridge. The printer E has a print resolution of 180 dpi. The printer E may perform single-color printing. It is assumed that the printer E is used to produce a label that has a cautionary note and/or a name of a thing printed thereon and is attached to a common place such as a surface of a furniture item or a stationery item. Therefore, the printer E is only required to print characters, simple symbols, and illustrations. The printer E may perform data communication with external devices via a Wi-Fi connection.

The printer F is a label printer for professional use. The printer F is configured to, when a cartridge storing a label-shaped sheet having a width of 15 mm to 102 mm is attached thereto, print an image on the sheet stored in the cartridge. The printer F has a print resolution of 300 dpi. The printer F may perform single-color printing. It is assumed that the printer F is used to produce a food label to be attached to a surface of a food container. Therefore, the printer F is required to print characters, enclosing lines, and a table-style layout, and continuously produce a large number of same labels. The printer F may perform data communication with external devices via a Wi-Fi connection, a wired LAN, and a USB connection.

The printer A is a page printer configured to perform printing on cut sheets having a size of B5 to A4. Further, the printer A has a print resolution of 1200 dpi. The printer A may perform color printing. It is assumed that the printer A is used for general printing in offices. The printer A may perform data communication with external devices via a Wi-Fi connection and a USB connection.

The printer B is a printer for decoration label. The printer B is configured to perform printing on a label having a width of about 3.5 mm to 12 mm. Further, the printer B is configured to use various colors of labels for decoration on sale. Therefore, the number of label types usable for the printer B is quite larger than for the printers E and F. The printer B has a print resolution of 180 dpi. The printer B may perform single-color printing. It is assumed that the printer B is used to produce a label for decoration such as a masking tape and used to print a picture pattern such as a pattern of continuous ribbon. The printer B may perform data communication with external devices via a Wi-Fi connection.

The printer C is a metal-working and wood-working printer configured to print an image on a surface of a set print medium that is made, for instance, of metal, wood, or glass. The printer C may perform image formation using laser light. Further, the printer C may perform data communication with external devices via a USB connection.

The printer D is planned to be developed as a label printer for professional use. The printer D may perform printing on a label having a width of 23 mm to 62 mm. The printer D may have a print resolution of 600 dpi. The printer D may perform three-color printing. It is assumed that the printer D is used to produce a label to be attached to a surface of a container for commercial product(s). The printer D may perform data communication with external devices via a Wi-Fi connection and a Bluetooth connection. Further, the vendor of the application program 26 may also need to meet requirements for the compatibility of the application program 26 with a device (e.g., a 3D printer and a 3D machine tool) configured to 3-dimensionally reproduce image(s) represented by image formation data, as well as the aforementioned devices (i.e., the printers A, B, C, D, E, and F).

Thus, in an attempt to design an application for a new device to be released, intended usage purposes, intended target users, print capability, communication capability, and a control method for the new device are all required to be taken into account. Hence, a large amount of burden is imposed on a designer of the application for the new device. To address the foregoing problems, in the illustrative embodiment, the application program 26 is designed as an integrated single application by combining the edit screen control module 27, the image data generating module 28, and the edit screen control module 27 that are separately designed. In this case, the edit screen control module 27 is designed to provide a user I/F that is suitable for as many usage purposes as possible and usable by as many users as possible. The image data generating module 28 is designed to generate image data corresponding to as many print capabilities as possible. The device control module 29 is designed to perform communication processing corresponding to as many communication capabilities as possible and perform control processing corresponding to as many control methods as possible.

Thus, it is possible to allocate respective different human resources to the designs for the individual modules 27 to 29, thereby designing the modules 27 to 29 in parallel. Further, for instance, in designing a new version of the application for a new model of a device that is intended for new usage purposes and new target users and has substantially the same print capability and communication capability as those of a conventional model and/or a heretofore-used model of the device, the human resources may be allocated only to designing a new version of the edit screen control module 27. Namely, in this case, the new version of the application may be designed in accordance with a first design policy to combine the updated version of the edit screen control module 27, the conventional version of the image data generating module 28, and a slightly-modified version of the conventional device control module 29. Further, the new version of application may be designed in accordance with a second design policy to combine the new version of the edit screen control module 27, a slightly-modified version of the conventional image data generating module 28, and a slightly-modified version of the conventional device control module 29. Thus, the aforementioned design policies provide flexibility in designing the application.

Further, for instance, in designing an application for MacOS to have substantially the same specifications as the application for Microsoft Windows, the edit screen control module 27 needs to be modified by changing only a portion of the module 27 related to the user interface so as to be suitable for MacOS. Additionally, the image data generating module 28 needs to be modified by changing only a drawing-related portion of the module 28 so as to be suitable for MacOS. Furthermore, the device control module 29 needs to be modified by changing only a communication-related portion of the module 29 so as to be suitable for MacOS.

Further, suppose for instance that a new model of a device is released which is intended for substantially the same usage purposes and target users as those of a conventional model and/or a heretofore-used model of the device, and has substantially the same print capability and communication capability as those of the conventional model and/or the heretofore-used model of the device, and further is communicable in a new communication method (e.g., using a new communication protocol). In this case, initially, a new version of the application may be designed and released by combining respective slightly-modified versions of the conventional edit image control module 27, the conventional image data generating module 28, and the conventional device control module 29. Thereby, a user is allowed to use the new model of the device. Thereafter, as a next step, another new version of the application may be designed and released by combining a new version of device control module 28, a slightly-modified version of the conventional edit image control module 27, and a slightly-modified version of the conventional image data generating module 28. Thus, the human resources may be allocated mainly to designing the new version of the device control module 28 to cause the CPU 12 to communicate with the new model of the device in the new communication method.

Figure 3:
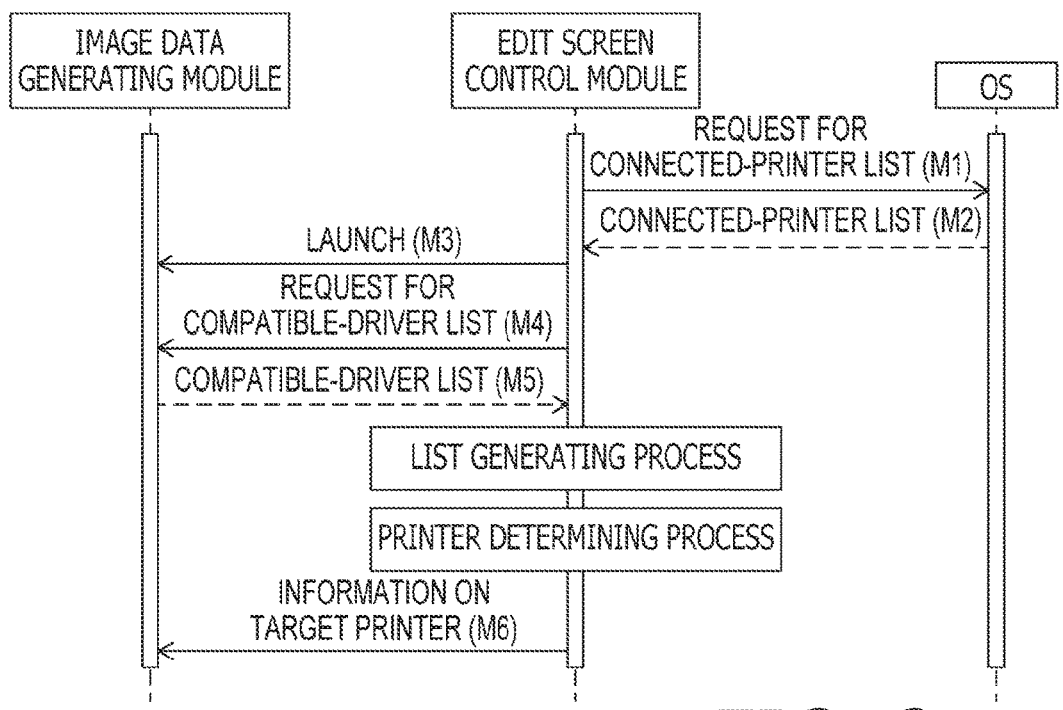
FIG. 3 is a sequence chart of an initial sequence in the illustrative embodiment according to one or more aspects of the present disclosure.

In response to receiving an instruction to launch the application program 26 via the input I/F 18, the CPU 12 launches the edit screen control module 27. Referring to FIG. 3, an initial sequence of processes among the launched edit screen control module 27, the image data generating module 28, and the OS 32 will be described. The edit screen control module 27 transmits to the OS 32 a request for a connected-printer list of printers communicably connected with the network I/F 20 (M1). As requested, the OS 32 provides a connected-printer list to the edit screen control module 27 (M2). The connected-printer list includes information for identifying each individual one of the printers communicably connected with the network I/F 20. FIG. 4 exemplifies the connected-printer list. Specifically, in the illustrative embodiment, the connected-printer list is a list of nicknames each identifying a corresponding one of the printers communicably connected with the network I/F 20. Model names of the connected printers are automatically assigned to the printers as their nicknames to be registered, respectively. When the same nickname as a nickname to be newly registered is already registered on the connected-printer list, a text such as "COPY" is added to the end of the nickname to be newly registered. Further, when there is no printer communicably connected with the network I/F 20, there is no value (i.e., no nickname) registered on the connected-printer list. In the following description, a nickname that is a model name registered as it is and a nickname that a model name registered with a text added thereto may be both referred to as "model name(s)."

Subsequently, the edit screen control module 27 launches the image data generating module 28 (M3). Next, the edit screen control module 27 transmits to the image data generating module 28 a request for a compatible-printer list of printers compatible with the image data generating module 28 (M4). The compatible-printer list includes information for identifying each individual one of the printers compatible with the image data generating module 28. The information for identifying each individual one of the compatible printers may be a model name of each compatible printer. Further, a name of a printer driver contains a model name of a printer compatible with the printer driver. Therefore, the information to be registered onto the compatible-printer list to identify each individual one of the printers compatible with the image data generating module 28 may be a name (hereinafter referred to as a "driver name") of a printer driver for each individual compatible printer. In the illustrative embodiment, an explanation will be provided of an example where a driver name is used as a model name of a compatible printer to be listed on the compatible-printer list. Hence, in the following description, the compatible-printer list may be referred to as a "compatible-driver list." FIG. 5 exemplifies a compatible-driver list. The compatible-driver list shown in FIG. 5 contains information on model names in association with information on a registered printer. It is noted that the registered printer is a previously-registered one of the printers compatible with the image data generating module 28. In a program code for the image data generating module 28, the compatible-driver list without information on the registered printer may be coded. The image data generating module 28 may store information on the registered printer into the memory 14, for instance, after receiving a below-mentioned message M6. Namely, when the information on the registered printer is required, the image data generating module 28 may read out and use the coded compatible-driver list and the information on the registered printer stored in the memory 14. For instance, in an attempt to provide the compatible-driver list, the image data generating module 28 may read out the coded compatible-driver list and the information on the registered printer stored in the memory 14. Thereafter, the image data generating module 28 may provide the read information.

The image data module 28 may be configured to, when installed into the PC 10, store the compatible-driver list coded in the module 28 into the memory 14. In this case, when the compatible-driver list is required, the image data generating module 28 may read out and use the compatible-driver list and the information on the registered printer that are both stored in the memory 14. It is noted that the compatible-driver list containing the information on the registered printer may be referred to as "the compatible-driver list and the information on the registered printer" for the sake of explanatory convenience. An installing process to install the application program 26 may be performed by an installer program (not shown). In this case, the installer program may store the compatible-driver list without the information on the registered printer into the memory 14. Further, the installer program may transmit an instruction to start the initial sequence to the edit screen control module 27, after storing the compatible-driver list into the memory 14.

When receiving information indicating a target printer to be used for printing, the image data generating module 28 stores a model name of the target printer indicated by the received information into the memory 14 as the registered printer. The image data generating module 28 may receive the information indicating the target printer, for instance, via the below-mentioned message M6. Further, the edit screen control module 27 may accept an operation to select the target printer via the input I/F 18, while an edit screen DS1 (see FIG. 11) is being displayed. In response to accepting the operation to select the target printer, the edit screen control module 27 may transmit the information indicating the target printer to the image data generating module 28. At this time, the image data generating module 28 may receive the information indicating the target printer.

Further, when receiving information indicating a target medium size from the edit screen control module 27, the image data generating module 28 stores, into the memory 14, the target medium size indicated by the received information, as a registered medium size. The image data generating module 28 may receive the information indicating the target medium size, for instance, via the below-mentioned message M13. Further, the edit screen control module 27 may accept an operation to select the target medium size via the input I/F 18, while the edit screen DS1 (see FIG. 11) is being displayed. In response to accepting the operation to select the target medium size, the edit screen control module 27 may transmit the information indicating the target medium size to the image data generating module 28. At this time, the image data generating module 28 may receive the information indicating the target medium size.

It is noted that a program configured to issue a request for execution of the printing process to the image data generating module 28 is not limited to the edit screen control module 27. When a second application program configured to issue a request for execution of the printing process to the image data generating module 28 is installed in the PC 10, the image data generating module 28 may receive information indicating the target printer to perform the printing process and information indicating the target medium size from the second application program, and may generate print data based on the target printer and the target medium size that are indicated by the received information. At this time, the image data generating module 28 may store the information indicating the target printer into the memory 14 as the registered printer, and may store the information indicating the target medium size into the memory 14 as the registered medium size. Namely, when the image data generating module 28 generates print data in response to the request from the second application program, the target printer corresponding to the print data may be stored as the registered printer in the memory 14.

In response to the request from the edit screen control module 27, the image data generating module 28 provides the compatible-driver list to the edit screen control module 27 (M5).

In response to receiving the compatible-driver list, the edit screen control module 27 starts a list generating process (see FIG. 6). First, the edit screen control module 27 determines whether there is a printer listed on the connected-printer list (S1). When the connected-printer list has no value registered thereon, the edit screen control module 27 determines that there is no printer listed on the connected-printer list (S1: No). Meanwhile, when the connected-printer list has one or more model names registered thereon, the edit screen control module 27 determines that there is a printer listed on the connected-printer list (S1: Yes). In response to determining that there is a printer listed on the connected-printer list (S1: Yes), the edit screen control module 27 acquires information (e.g., a model name) identifying a head one of the printers listed on the connected-printer list (S3). Then, the edit screen control module 27 determines whether the model name of the printer acquired in S3 is registered on the compatible-driver list (S5). In response to determining that the model name of the printer acquired in S3 is registered on the compatible-driver list (S5: Yes), the edit screen control module 27 adds the printer identified by the information acquired in S3 onto a selectable-printer list (S7). Namely, the printer added onto the selectable-printer list is a printer having a model name registered on the compatible-driver list, among the printers listed on the connected-printer list. Subsequently, the edit screen control module 27 deletes, from the connected-printer list, the head one (i.e., the printer identified by the information acquired in S3) of the printers listed on the connected-printer list (S9). Afterwards, the edit screen control module 27 goes back to S1. Meanwhile, in response to determining that there is no printer listed on the connected-printer list (S1: No), the edit screen control module 27 terminates the list generating process. In the illustrative embodiment, nicknames (including model names) are actually registered on the connected-printer list, and driver names are actually registered on the compatible-printer list. Nonetheless, what is actually registered on the connected-printer list may be any other information indicating a model name of a printer but the model name of the printer. Further, what is actually registered on the compatible-printer list may be any other information indicating a model name of a printer but a driver name of a printer driver compatible with the printer. For instance, "information indicating a model name of a printer" may be an IP address, a MAC address, and a serial number that are usable to identify an individual printer connected with the network I/F 20. The IP address, the MAC address, and the serial number are not information including the model name of the connected printer, but are associated with "information indicating the model name" and the model name or the nickname. Such information associated with "information indicating the model name" and the model name or the nickname may be registered on the connected-printer list. Alternatively, the edit screen control module 27 may previously acquire such information associated with "information indicating the model name" and the model name or the nickname and store the acquired information into the memory 14. Further, in a case where the connected-printer list contains "information indicating the model name" and information associated with the model name or the nickname, the edit screen control module 27 may store these pieces of information into the memory 14 when acquiring the connected-printer list via M2. In a case where the connected-printer list does not contain a model name but contains "information indicating the model name," when acquiring the information identifying the head one of the printers listed on the connected-printer list in S3, the edit screen control module 27 may read out a model name that is stored in the memory 14 in association with the printer identified by the information acquired in S3. Then, in S5, the edit screen control module 27 may determine whether the read model name is registered on the compatible-printer list. Further, via the message M1, the edit screen control module 27 may transmit the request for the connected-printer list, not to the OS 32 but to the device control module 29. Alternatively, via the message M1, the edit screen control module 27 may transmit a request for a connected-printer list, not only to the OS 32 but as well to the device control module 29. As requested, the device control module 29 may provide a connected-printer list to the edit screen control module 27, in the same manner as the OS 32 does via M2. The edit screen control module 27 may merge the connected-printer list received from the device control module 29 with the connected-printer list received from the OS 32.

After completion of the list generating process, the edit screen control module 27 starts a printer determining process (see FIG. 7). First, the edit screen control module 27 determines whether the registered printer is listed on the connected-printer list (S11). In response to determining that the registered printer is listed on the connected-printer list (S11: Yes), the edit screen control module 27 determines the registered printer as the target printer to be used for printing (S18). Afterwards, the edit screen control module 27 terminates the printer determining process. Meanwhile, in response to determining that the registered printer is not listed on the connected-printer list (S11: No), the edit screen control module 27 determines whether a printer having the same model name as the model name of the registered printer is listed on the selectable-printer list (S13). In response to determining that a printer having the same model name as the model name of the registered printer is listed on the selectable-printer list (S13: Yes), the edit screen control module 27 determines, as the target printer, the listed printer having the same model name as the model name of the registered printer (S19). Meanwhile, in response to determining that a printer having the same model name as the model name of the registered printer is not listed on the selectable-printer list (S13: No), the edit screen control module 27 determines whether a printer of the same series as the registered printer is listed on the selectable-printer list (S15). In response to determining that a printer of the same series as the registered printer is listed on the selectable-printer list (S15: Yes), the edit screen control module 27 determines, as the target printer, the listed printer of the same series as the registered printer (S21). Afterwards, the edit screen control module 27 terminates the printer determining process. Meanwhile, in response to determining that a printer of the same series as the registered printer is not listed on the selectable-printer list (S15: No), the edit screen control module 27 determines, as the target printer, a head one of the printers listed on the selectable-printer list (S17). Afterwards, the edit screen control module 27 terminates the printer determining process. After completion of the printer determining process, the edit screen control module 27 informs the image data generating module 28 of the target printer (M6) (see FIG. 3). The image data generating module 28 stores, into the memory 14, the target printer as the registered printer. For instance, when the registered printer is the printer 50, and the printer 50 is not listed on the selectable-printer list, but the printer 51 is listed thereon, since the printer 51 has the same model name (i.e., "PA100") as the model name of the printer 50, the printer 51 is determined as the target printer to be used for printing. Further, for instance, when the registered printer is the printer 50, and none of the printers 50 and 51 is listed on the selectable-printer list, but the printer 52 is listed thereon, since the printer 52 has the same series name (i.e., "A") as the series name of the printer 50, the printer 52 is determined as the target printer to be used for printing.

After transmission of the message M6, the edit screen control module 27 starts a medium determining sequence (see FIG. 8) to determine a target medium size. First, the edit screen control module 27 transmits, to the image data generating module 28, information on the selectable-printer list generated in the list generating process and a request for print medium information (M11). As requested, the image data generating module 28 transmits a print medium list to the edit screen control module 27 (M12). As shown in FIG. 9, the print medium list may include one or more pieces of information each having a model name and a print medium size associated with each other. On the print medium list, each print medium size is a size (e.g., a tape width expressed with a unit of "mm") of a print medium usable by a printer having a corresponding model name. Further, the print medium list includes information on the registered medium size. In response to receiving the message M12, the edit screen control module 27 starts a medium determining process (see FIG. 10).

After starting the medium determining process, first, the edit screen control module 27 determines whether the registered medium size is listed in the same line as the model name of the target printer on the print medium list (S31). In response to determining that the registered medium size is listed in the same line as the model name of the target printer on the print medium list (S31: Yes), the edit screen control module 27 determines the registered medium size as a target medium size to be used for printing (S33). Afterwards, the edit screen control module 27 terminates the medium determining process. Meanwhile, in response to determining that the registered medium size is not listed in the same line as the model name of the target printer on the print medium list (S31: No), the edit screen control module 27 sets a print medium size closest to the registered medium size as the target medium size (S35). Afterwards, the edit screen control module 27 terminates the medium determining process. For instance, when the registered medium size is "6," and the target printer is the printer 53, since the model name of the printer 53 is "PB100," and sizes "12" and "15" are associated with "PB100," the closest size "12" to the registered medium size "6" is set as the target medium size to be used for printing. After terminating the medium determining process, the edit screen control module 27 informs the image data generating module 28 of the target medium size (M13). The image data generating module 28 stores, into the memory 14, the target medium size as the registered medium size.

After completion of the medium determining process, the edit screen control module 27 causes the LCD 16 to display the edit screen DS1 (see FIG. 11) for accepting an operation to edit an object image displayed thereon. The edit screen DS1 includes a menu bar 101, an operation window 102, a layout screen 103, a size selection button 105, and a printer selection button 106. On the menu bar 101, for instance, a plurality of selectable menu options such as "Create File," "Save," and "Print" are displayed. On the operation window 102, for instance, a plurality of widgets for setting a font and a size of a text are displayed. The layout screen 103 is configured to accept input data such as a character string. The layout screen 103 includes a data input area 104. A vertical size of the data input area 104 varies depending on the target medium size. FIG. 11 exemplifies an edit screen DS1 including an object image Obj1 displayed when "abcdef" is accepted as input data.

When the user wishes to change the target printer, the user may click and select the printer selection button 106, for instance, with the mouse. In the following description, selecting a selectable option by clicking the option with the mouse may be described simply as "selecting a selectable option." In response to the selection of the print selection button 106 being accepted via the input I/F 20, the application program 26 displays the selectable-printer list. The user may select one of selectable printers listed on the selectable-printer list. In response to one of the selectable printers being selected via the input I/F 20, the edit screen control module 27 determines whether the selected printer is included in the connected printers. In response to determining that the selected printer is included in the connected printers, the edit screen control module 27 changes the target printer from the printer determined in the printer determining process to the selected printer. Then, the edit screen control module 27 informs the image data generating module 28 of the newly-set target printer (i.e., the selected printer).

Further, when the user wishes to change the target medium size, the user may select the size selection button 105. In response to the selection of the size selection button 105 being accepted via the input I/F 20, the application program 26 displays a print medium list listing print media for the target printer. On the print medium list, for instance, respective sizes of the print media for the target printer may be displayed. The user may select one of the sizes listed on the print medium list. In response to one of the sizes being selected via the input I/F 20, the edit screen control module 27 determines whether the selected size is in a line including the model name of the target printer on the print medium list, in the same manner as executed in S31. In response to determining that the selected size is in the line including the model name of the target printer on the print medium list, the edit screen control module 27 changes the target medium size from the size determined in the medium determining process to the selected size. Then, the edit screen control module 27 informs the image data generating module 28 of the newly-set target medium size (i.e., the selected size).

Further, when the user wishes to input characters as input data, the user may click a position within the data input area 104 with the mouse so as to display a text box and input characters within the text box via the keyboard. In response to the input data being accepted via the input I/F 18, the application program 26 causes the LCD 16 to display on the layout screen 103 an object image based on the input data. Specifically, in response to the input data being accepted via the input I/F 18, the edit screen control module 27 provides the input data (hereinafter, which may be referred to as "first instruction information") to the image data generating module 28. In response to receiving the input data from the edit screen control module 27, the image data generating module 28 generates display image data corresponding to the target printer, and provides the generated display image data to the edit screen control module 27. The display image data represents a display image containing an object image edited in accordance with the input data. Subsequently, the edit screen control module 27 receives the display image data from the image data generating module 28, and causes the LCD 16 to display the display image containing the object image, based on the received display image data.

Further, when the user wishes to produce a label on which the object image displayed in the data input area 104 is printed, the user may select the menu option "Print" on the menu bar 101. In response to the selection of the menu option "Print" on the menu bar 101 being accepted via the input I/F 18 while the object image is being displayed on the edit screen DS1, the application program 26 provides the target printer with an instruction to perform printing. Specifically, the edit screen control module 27 causes the LCD 16 to display the object image, and in response to the selection of the menu option "Print" on the menu bar 101 being accepted via the input I/F 18 while the object image is being displayed on the edit screen DS1, provides the image data generating module 28 with an instruction (hereinafter, which may be referred to as "second instruction information") to generate print image data. The print image data represents an image containing the object image based on the display image data, and is provided to the target printer. Subsequently, the image data generating module 28 receives the second instruction information from the edit screen control module 27. In response to receiving the second instruction information, the image data generating module 28 generates print image data corresponding to the display image data. Next, the image data generating module 28 provides the generated print image data to the target printer.

The edit screen control module 27 receives the compatible-driver list from the image data generating module 28 via the message M5. Further, the edit screen control module 27 receives, via the message M2, the connected-printer list of the printers connected with the PC 10 via the network I/F 20. In the list generating process, the edit screen control module 27 generates the selectable-printer list by extracting the printers listed on the compatible-driver list from the connected-printer list. Further, in the printer determining process, the edit screen control module 27 determines, as the target printer, one of the printers listed on the selectable-printer list. In response to receiving the first instruction information, the image data generating module 28 generates the display image data corresponding to the target printer. Further, in response to receiving the second instruction information, the image data generating module 28 generates the print image data corresponding to the display image data and suitable for the target printer. Thus, it is possible to separate from each other the edit screen control module 27 configured to perform processes via the input I/F 18 and the image data generating module 28 configured to generate the print image data to be used for printing by the target printer.

When the registered printer is listed on the selectable-printer list (S11: Yes), the edit screen control module 27 determines the registered printer as the target printer in S18. Thus, when the registered printer is listed on the selectable-printer list, the registered printer may be determined as the target printer in S18.

When the registered printer is not listed on the selectable-printer list (S11: No), the edit screen control module 27 may determine, as the target printer, a printer listed on the selectable-printer list with the same model name as the model name (hereinafter, which may be referred to as "type information") of the registered printer, in S19. Further, in response to determining that a printer having the same model name as the model name of the registered printer is not listed on the selectable-printer list (S13: No), the edit screen control module 27 may determine, as the target printer, a printer listed on the selectable-printer list with the same series name as the series name of the registered printer, in S21. Thus, when the registered printer is not listed on the selectable-printer list, but a printer having the same model name as the model name of the registered printer is listed on the selectable-printer list, the listed printer may be determined as the target printer. Further, when a printer having the same model name as the model name of the registered printer is not listed on the selectable-printer list, but a printer having the same series name as the series name of the registered printer is listed on the selectable-printer list, the listed printer may be determined as the target printer.

The edit screen control module 27 causes the LCD 16 to display the selectable-printer list, accepts a selection of a printer from among the printers listed on the selectable-printer list, sets the selected printer as the target printer, and informs the image data generating module 28 of the set target printer. Thus, a printer listed on the selectable-printer list may be determined as the target printer. The user may select, as the target printer, one of the printers listed on the printable-printer list.

When the registered medium size is listed on the print medium list, the edit screen control module 27 determines a print medium having the registered medium size as a target print medium in S33, and informs the image data generating module 28 of the determined target print medium. Further, when the registered medium size is not listed on the print medium list, the edit screen control module 27 determines a print medium having a print medium size closest to the registered medium size as the target print medium in S35, and informs the image data generating module 28 of the determined target print medium. Thus, when the registered medium size is listed on the print medium list, a print medium having the registered medium size may be set as the target print medium. Further, when the registered medium size is not listed on the print medium list, a print medium having a print medium size closets to the registered medium size may be set as the target print medium.

Further, the image data generating module 28 generates an image data file containing the print image data corresponding to the target printer and the target medium size.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, the following modifications may be practiced in accordance with aspects of the present disclosure.

<Modifications>

In the aforementioned illustrative embodiment, aspects of the present disclosure have been applied to the printers 50 to 53. Nonetheless, for instance, aspects of the present disclosure may be applied to a machine tool for machining metal in accordance with image data.

In the aforementioned illustrative embodiment, a usable print medium is specified by a print medium size thereof. Nonetheless, for instance, a usable print medium may be specified by a material thereof.

In the aforementioned illustrative embodiment, the application program 26 is stored in the memory 14 of the PC 10. Nonetheless, the application program 26 may be stored in a server that is connectable with the PC 10 via the network 56. In this case, the application program 26 may be delivered as information or signals carrying the application program 26, to the PC 10 via the network 56 (e.g., an Internet).

In the aforementioned illustrative embodiment, the edit screen control module 27 is configured to perform the list generating process. Nonetheless, the image data generating module 28 may be configured to perform the list generating process. Specifically, in response to receiving the connected-printer list from the OS 32, the edit screen control module 27 may provide the connected-printer list to the image data generating module 28. In response to receiving the connected-printer list from the edit screen control module 27, the image data generating module 28 may perform the list generating process and provide the generated selectable-printer list to the edit screen control module 27.

In the aforementioned illustrative embodiment, the application program 26 has been set forth as a program intended for the printers 50 to 53 for the sake of explanatory convenience. Nonetheless, an application program 26 intended for other printers may be configured substantially in the same manner as the application program 26 intended for the printers 50 to 53. In this case, the application program 26 intended for the other printers may include a module (e.g., an edit screen control module 27) configured to provide a user I/F suitable for other usage purposes and other target users, a module (e.g., an image data generating module 28) configured to generate image data corresponding to print capabilities of the other printers, and a module (e.g., a device control module 29) configured to perform communication processing and control processing corresponding to communication capabilities and control methods of the other printers.

Associations between elements exemplified in the aforementioned illustrative embodiments and elements according to aspects of the present disclosure will be exemplified below. The memory 14 may be an example of a "non-transitory computer-readable medium" according to aspects of the present disclosure. The application program 26 may be included in "computer-readable instructions" according to aspects of the present disclosure. The image data generating module 28 may be included in the "computer-readable instructions" according to aspects of the present disclosure. Specifically, the image data generating module 28 may be an example of a "first module" of the "computer-readable instructions" according to aspects of the present disclosure. The edit screen control module 27 may be included in the "computer-readable instructions" according to aspects of the present disclosure. Specifically, the edit screen control module 27 may be an example of a "second module" of the "computer-readable instructions" according to aspects of the present disclosure. The device control module 29 may be included in the "computer-readable instructions" according to aspects of the present disclosure. Specifically, the device control module 29 may be an example of a "third module" of the "computer-readable instructions" according to aspects of the present disclosure. The PC 10 may be an example of an "information processing apparatus" according to aspects of the present disclosure. The CPU 12 may be an example of a "processor" according to aspects of the present disclosure. The LCD 16 may be an example of a "display" according to aspects of the present disclosure. The input I/F 18 may be an example of a "user interface" according to aspects of the present disclosure. The network I/F 20 may be an example of a "network interface" according to aspects of the present disclosure. The OS 32 may be an example of an "operating system" according to aspects of the present disclosure. The display image data may be an example of "first image data" according to aspects of the present disclosure. The print image data may be an example of "second image data" according to aspects of the present disclosure. The compatible-driver list may be an example of "compatible-device information" according to aspects of the present disclosure. The connected-printer list may be an example of "connected-device information" according to aspects of the present disclosure. The selectable-printer list may be an example of a "selectable-device list" according to aspects of the present disclosure. The target printer may be an example of a "target device" according to aspects of the present disclosure.

What is claimed is:

1. A non-transitory computer-readable medium storing computer-readable instructions that are executable by a processor coupled with an information processing apparatus, the information processing apparatus comprising a display, a user interface, and a network interface, the instructions comprising a first module and a second module, wherein the second module is configured to, when executed by the processor, cause the processor to:

control the display to display an edit screen for editing an object, accept an edit instruction to edit the object, via the user interface while the edit screen is being displayed, provide the first module with first instruction information instructing the first module to generate first image data, the first image data representing a first image containing the object edited in accordance with the accepted edit instruction, after providing the first instruction information to the first module, receive the first image data generated by the first module, from the first module, and control the display to display on the edit screen the first image containing the edited object, based on the received first image data; and in response to accepting an instruction to provide second image data to a target device, via the user interface while the first image is being displayed on the edit screen, provide the first module with second instruction information instructing the first module to generate the second image data, the second image data representing a second image containing the edited object, wherein the first module is configured to, when executed by the processor, cause the processor to:

receive the first instruction information from the second module, in response to receiving the first instruction information, generate the first image data, and provide the generated first image data to the second module; and in response to receiving the second instruction information from the second module after providing the first image data, generate the second image data corresponding to the first image data, and provide the generated second image data to the target device, wherein the second module is further configured to, when executed by the processor, cause the processor to:

receive compatible-device information from the first module, the compatible-device information specifying compatible devices that are compatible with the first module, receive connected-device information specifying connected devices that are connected via the network interface, determine, as the target device, a particular one of selectable devices that are specified by both the received compatible-device information and the received connected-device information, and provide target device information identifying the determined target device to the first module, and wherein the first module is further configured to, when executed by the processor, cause the processor to:

provide the compatible-device information to the second module, after providing the compatible-device information, receive the target device information from the second module, and in response to receiving the first instruction information after receiving the target device information, generate the first image data corresponding to the target device identified by the target device information; and in response to receiving the second instruction information after receiving the target device information, generate the second image data corresponding to the first image data and suitable for the target device identified by the target device information, and provide the generated second image data to the target device via the network interface.

2. The non-transitory computer-readable medium according to claim 1, wherein the second module is further configured to, when executed by the processor, cause the processor to extract, as the selectable devices, devices included in the compatible devices from among the connected devices.

3. The non-transitory computer-readable medium according to claim 1, wherein the second module is further configured to, when executed by the processor, cause the processor to:

receive registered-device information on a registered device from the first module, the registered device being a previously-registered one of the compatible devices; and when the registered device is included in the selectable devices, determine the registered device as the target device.

4. The non-transitory computer-readable medium according to claim 3, wherein the compatible-device information includes type information each piece of which specifies a device type of a corresponding one of the compatible devices, wherein the registered-device information includes type information specifying a device type of the registered device, wherein the connected-device information includes type information each piece of which specifies a device type of a corresponding one of the connected devices, and wherein the second module is further configured to, when executed by the processor, cause the processor to:

when the registered device is not included in the selectable devices, determine a first specific one of the selectable devices as the target device, the first specific one of the selectable devices being of the device type specified by the type information of the registered device.

5. The non-transitory computer-readable medium according to claim 4, wherein each piece of the type information specifying the device type of an individual device includes group information specifying a device group to which the individual device belongs, and wherein the second module is further configured to, when executed by the processor, cause the processor to:

when the registered device is not included in the selectable devices, and there is no selectable device of the device type specified by the type information of the registered device, determine a second specific one of the selectable devices as the target device, the second specific one of the selectable devices belonging to the device group specified by the group information of the registered device.

6. The non-transitory computer-readable medium according to claim 1, wherein the second module is further configured to, when executed by the processor, cause the processor to:

control the display to display a selectable-device list of the selectable devices, accept a selection of a device from among the selectable devices listed on the selectable-device list, via the user interface, change the target device from the particular one of the selectable devices to the selected one of the selectable devices, and inform the first module of the target device changed to the selected one of the selectable devices.

7. The non-transitory computer-readable medium according to claim 1, wherein the second module is further configured to, when executed by the processor, cause the processor to:

receive usable-medium information specifying one or more media usable by the target device and registered-medium information specifying a previously registered medium from the first module;

when the registered medium specified by the received registered-medium information is included in the one or more usable media specified by the received usable-medium information, determine the registered medium as a target medium; and inform the first module of the determined target medium.

8. The non-transitory computer-readable medium according to claim 7, wherein the usable-medium information includes size information each piece of which specifies a size of a corresponding medium usable by the target device, wherein the registered-medium information includes size information specifying a size of the registered medium, and wherein the second module is further configured to, when executed by the processor, cause the processor to:

when the registered medium specified by the received registered-medium information is not included in the one or more usable media specified by the received usable-medium information, determine, as the target medium, a medium having a size closest to the size of the registered medium among the one or more usable media specified by the received usable-medium information.

9. The non-transitory computer-readable medium according to claim 7, wherein the first module is further configured to, when executed by the processor, cause the processor to generate a file containing the second image data corresponding to the target device and the target medium.

10. The non-transitory computer-readable medium according to claim 1, wherein the instructions further comprise a third module configured to, when executed by the processor, cause the processor to control the connected devices via the network interface, and wherein the second module is further configured to, when executed by the processor, cause the processor to receive the connected-device information from the third module.

11. The non-transitory computer-readable medium according to claim 1, wherein the information processing apparatus further comprises an operating system installed therein, and wherein the second module is further configured to, when executed by the processor, cause the processor to receive the connected-device information from the operating system.

12. A non-transitory computer-readable medium storing computer-readable instructions that are executable by a processor coupled with an information processing apparatus, the information processing apparatus comprising a display, a user interface, and a network interface, the instructions comprising an image editor and an image data generator, the image editor being configured to, when executed by the processor, cause the processor to:

control the display to display an edit screen for editing an object, accept an edit instruction to edit the object, via the user interface while the edit screen is being displayed, provide the image data generator with first instruction information instructing the image data generator to generate first image data, the first image data representing a first image containing the object edited in accordance with the accepted edit instruction, after providing the first instruction information to the image data generator, receive the first image data generated by the image data generator, from the image data generator, and control the display to display on the edit screen the first image containing the edited object, based on the received first image data;

in response to accepting an instruction to provide second image data to a target device, via the user interface while the first image is being displayed on the edit screen, provide the image data generator with second instruction information instructing the image data generator to generate the second image data, the second image data representing a second image containing the edited object; and receive compatible-device information from the image data generator, the compatible-device information specifying compatible devices that are compatible with the image data generator, receive connected-device information specifying connected devices that are connected to a network via the network interface, extract selectable devices conforming to the compatible-device information from among the connected devices of the network specified by the connected-device information, select the target device from among the selectable devices extracted based on both the received compatible-device information and the received connected-device information, and provide target device information identifying the selected target device to the image data generator.

13. A non-transitory computer-readable medium storing computer-readable instructions that are executable by a processor coupled with an information processing apparatus, the information processing apparatus comprising a display, a user interface, and a network interface, the instructions comprising an image data generator and an image editor, the image generator being configured to, when executed by the processor, cause the processor to:

provide compatible-device information to the image editor, the compatible-device information specifying compatible devices that are compatible with the image data generator, after providing the compatible-device information, receive target device information identifying a target device from the image editor, the target device being selected from among selectable devices conforming to the compatible-device information and extracted from among connected devices connected to a network via the network interface and specified by connected-device information, in response to receiving first instruction information from the image editor after receiving the target device information, generate first image data corresponding to the target device identified by the target device information, and provide the generated first image data to the image editor; and in response to receiving second instruction information from the image editor after providing the first image data, generate second image data corresponding to the first image data and suitable for the target device identified by the target device information, and provide the generated second image data to the target device via the network interface.

\* \* \* \* \*